(12) United States Patent
Sukhman et al.

(10) Patent No.: US 6,342,687 B1
(45) Date of Patent: Jan. 29, 2002

(54) PORTABLE LASER SYSTEM WITH PORTABLE OR STATIONARY FUME EVACUATION

(75) Inventors: Yefim P. Sukhman; Christian J. Risser, both of Scottsdale; Stanfano J. Noto, Mesa; James W. Rabideau, Chandler, all of AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/506,052

(22) Filed: Feb. 17, 2000

(51) Int. Cl.⁷ .............................................. B23K 26/14
(52) U.S. Cl. .............................. 219/121.6; 219/121.67; 219/121.84; 266/49
(58) Field of Search .................... 219/121.6, 121.67, 219/121.84, 121.69, 121.72, 121.68; 266/49, 48

(56) References Cited

U.S. PATENT DOCUMENTS

| | | | | |
|---|---|---|---|---|
| 3,728,866 A | * | 4/1973 | Layton | |
| 3,815,625 A | * | 6/1974 | Weise | |
| 4,152,844 A | * | 5/1979 | Materniak, nee Balcerowicz et al. | |
| 4,505,190 A | * | 3/1985 | Fink et al. | |
| 4,985,780 A | | 1/1991 | Garnier et al. | |
| 5,051,558 A | | 9/1991 | Sukhman | |
| 5,315,091 A | * | 5/1994 | O'Brien et al. | |
| 5,511,764 A | * | 4/1996 | Wonsetler | |
| 5,826,779 A | * | 9/1998 | Jacks et al. | |
| 5,906,760 A | * | 5/1999 | Robb et al. | |
| 6,013,909 A | * | 1/2000 | Aramaki et al. | |
| 6,111,225 A | * | 8/2000 | Ohkase et al. | |
| 6,189,482 B1 | * | 2/2001 | Zhao et al. | |

* cited by examiner

*Primary Examiner*—Tom Dunn
*Assistant Examiner*—Jonathan Johnson
(74) *Attorney, Agent, or Firm*—Abelman, Frayne & Schwab

(57) ABSTRACT

A portable laser processing module is adapted to be quickly and easily independently interfaced between a stationary exhaust docking station for fume extraction during in-office use and a portable air processing module for fume extraction during field use. A passageway in the housing connects the work area to an exhaust port which communicates with an inlet port in the docking station or the portable air processing module and ultimately to a blower unit in a facility or in an internal compartment in the portable air processing module which maintains a negative pressure in the work area for removal of fumes, debris, particulates, and contaminants therefrom. Guides are receivable in recesses between the laser processing module and the docking station or portable air processing module for guiding the module thereon, and a gasket seals the exhaust port and inlet port when the module is supported on the docking station or the portable air processing unit. A filtration unit including a filter set may be housed internally of the portable air processing unit.

37 Claims, 3 Drawing Sheets

PORTABLE LASER SYSTEM WITH PORTABLE OR STATIONARY FUME EVACUATION

CROSS-REFERENCES TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Fields of the Invention

The present invention relates generally to apparatuses and methods of extracting fumes from a laser material processing system, and, more particularly, to a portable laser material processing system which is adapted to be alternately interfaced with a stationary fume extraction docking station for stationary use or a portable air processing module for mobile use in the field.

2. Discussion of Background and Prior Art a. Widespread Applications And Rapid Growth Of Laser Material Processing Systems Lasers, especially $CO_2$ and Nd YAG lasers, have experienced rapid growth in recent years and are now used in a multitude of applications that include engraving, marking, drilling, cutting, and welding to name just a few. Many problems which require controlled material processing might find a potential solution with the laser.

b. The Fume Extraction Problem

Laser material processing systems typically come with a laser source and a laser material processing platform which includes a cabinet or housing enclosing a work table and work area accessible through top and front doors for loading and unloading a workpiece, a beam delivery system, and a CPU for receiving a work program and controlling the delivery of the laser beam to the workpiece in accordance with the work program.

During laser material processing a significant amount of fumes, smoke, debris, and contaminants are produced and must be extracted from the work area and the air either cleaned and recirculated or exhausted to the atmosphere. In the past this requirement has been satisfied by a variety of air filtration and air cleansing devices and processes.

Adding to the problem, however, is the fact that laser sources and laser material processing platforms are among the most expensive devices to buy. Small business units have to stretch their budget to buy just one system comprising a laser source and a laser material processing platform which is typically set up for use in an office or manufacturing facility with a stationary installation for extracting fumes from the work area and expelling such fumes to the atmosphere via an ordinary duct and exhaust blower system.

c. Prior Stationary Closed Loop Air Filtration Systems

In a typical prior system by Sukhman in U.S. Pat. No. 5,051,558 there is disclosed just such a housing enclosing a workpiece on a table with the work area being kept free of contaminants by a blower which removes the air from the enclosure and then recirculates the air through a filter before returning it to the work area in a 100% closed loop system. The problems with such a system are that the enclosure ie under pressure allowing fumes to escape into the room because the cabinet is not sealed, and the system is preferably stationary.

Accordingly, it is an object of the present invention to provide a portable laser material processing system with fume extraction that maintains a negative pressure in the work area.

d. Prior Open Loop Portable Systems

When there is a need to have the laser system in the field for temporary use, such as, for a demonstration at a customer location, or at a show, the small businesses are put to the trouble of disassembling the manufacturing installation, or buying another system, or foregoing the opportunity entirely.

To fill this need, portable laser systems were developed. In one such system by Gamier in U.S. Pat. No. 4,985,780 there is disclosed a 2'×2.5'×1' portable laser engraving system weighing about 75 lbs with an X-Y beam delivery system and work area in an enclosed cabinet with a fume evacuation system that apparently keeps the work area under a negative pressure by delivering the smoke or other gases and debris away from the work area through a corrugated hose. The problem with this system is that it exhausts fumes directly to the atmosphere outside of the facility through the exhaust hose, which, in most cases, is not feasible, such as, when operating in the field. Accordingly, it is an object of the present invention to provide a laser processing system which is rapidly coupled between either a stationary docking platform with a permanent exhaust system to the outside atmosphere or a portable module which can temporarily filter the exhaust air in the field in facilities that do not have readily available stationary exhaust systems.

Accordingly, there is still a great unfilled need for, and it is an object of the present invention to provide, a reasonably priced portable laser processing module adapted to meet many needs by being quickly and easily independently interfaced between a stationary exhaust docking station for fume extraction during in-office use and a portable air processing module for fume extraction during field use.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein.

One aspect of the invention is a portable laser processing module constructed and configured for fumes extraction which includes a housing supporting therein a laser source and a beam delivery system for delivering a laser beam to a workpiece supportable in an enclosed interior work area therein and a passageway in the housing from the work area to an exhaust port in a base member such that when the housing is supported on a fumes extraction device, the exhaust port of the housing mates with an inlet port on the fumes extraction device for extracting the fumes from the work area through the passageway to the fume extraction device.

Further features of this aspect of the invention include the passageway being a channel between an opening in an exhaust manifold at the work area and the exhaust port, guides on the housing constructed and configured for cooperating with guides on the fumes extraction device for cooperatively positioning the housing thereonto, a gasket for sealing the exhaust port and an inlet port on the fumes extraction device, and the housing having an air inlet opening for use in open loop or semi-closed loop operations.

A second aspect of the invention is a stationary docking station for supporting a housing of a portable laser processing module thereon which includes a support platform having an exhaust opening therein which is constructed and configured for communicating with a fume extraction device, and an inlet port constructed and configured for communicating with the exhaust port of the portable laser processing module for extracting the fumes from a work area of the portable laser processing module and delivering the fumes to the fume exhaustion device.

Further features of this aspect of the invention include guides on the stationary platform constructed and configured for cooperating with guides on the portable laser processing module for cooperatively receiving and positioning the portable laser processing module thereonto, a gasket for sealing the inlet port and an exhaust port on the portable laser processing module, a recessed opening in the support platform constructed and configured for cooperating with an air inlet opening of the portable laser processing module during open loop operation for allowing air to enter said inlet opening without interference.

A third aspect of the invention is a portable air processing module for supporting a housing of a portable laser processing module thereon which includes a portable cabinet enclosing an interior compartment supporting an air processing unit therein including a blower and having an inlet port constructed and configured for communicating with the exhaust port of the portable laser processing module for extracting the fumes from a work area of the portable laser processing module to the interior compartment, and an air outlet for exhausting air from the interior compartment.

Further features of this aspect of the invention include guides on the portable cabinet constructed and configured for cooperating with guides on the portable laser processing module for cooperatively receiving and positioning the portable laser processing module thereonto, a gasket for sealing the inlet port and an exhaust port on the portable laser processing module, a first air outlet for discharging air from the interior of the module during normal open loop operation, an alternative air outlet on the top surface of the cabinet constructed and configured for sealingly mating with a housing air inlet opening for delivering a recirculated portion of the air from the interior compartment to a work area of the housing, and the balance of the air from the interior compartment being exhausted through the first air outlet when operating about 80% closed loop in order to maintain a negative pressure in the work area, and the air processing unit including one or more air filters therein.

A fourth aspect of the invention is a portable laser processing module with fumes extraction which includes a housing supporting therein a laser source and a beam delivery system for delivering a laser beam to a workpiece supportable in an enclosed interior work area therein and a passageway in the housing from the work area to an exhaust port, and a stationary docking station supporting the housing thereon having an exhaust opening communicable with a fume extraction device and an inlet port communicating with the exhaust port for extracting the fumes from the work area and through the passageway for delivery to the fume extraction device through the exhaust opening.

A fifth aspect of the invention is a portable laser processing module with fumes extraction which includes a housing supporting therein a laser source and a beam delivery system for delivering a laser beam to a workpiece supportable in an enclosed interior work area therein and a passageway in the housing from the work area to an exhaust port, and a portable air processing module supporting the housing thereon and having an interior compartment and an inlet port communicating with the exhaust port for extracting the fumes from the work area and through the passageway for delivery to the interior compartment.

A sixth aspect of the invention is a portable laser processing module with fumes extraction which includes a housing supporting therein a laser source and a beam delivery system for delivering a laser beam to a workpiece supportable in an enclosed interior work area therein and a passageway in the housing from the work area to an exhaust port, a stationary docking station for supporting the housing thereon and having an inlet port communicable with the exhaust port and an exhaust opening therein which is communicable with a fume extraction device, and a portable air processing module for supporting the housing thereon and having an inlet port communicable with the exhaust port and the interior of the portable air processing module, the housing alternatively supportable on either the docking station or the portable air processing module for extracting the fumes from the work area and through the passageway for delivery to the fume extraction device or the interior of the portable air processing module.

The advantages of the invention include the following:
1. Portability of the laser processing module itself enabling field use of a laser system at a reasonable price that even small businesses can afford.
2. Elimination of stationary facility fume extraction improvements where it is satisfactory to operate with the portable laser processing module mounted on the portable air processing module.
3. Quick reconfiguration from office to field use.
4. Further more efficient use of invested capital.
5. Further reductions in buying requirements until the need arises that flexibility cannot satisfy.
6. Further expanded utility of capital equipment without adding new equipment.
7. Further quicker response to customers' needs.
8. Further reduced setup costs.
9. Further enhanced productivity.
10. Further increased profit-making opportunities.

BRIEF DESCRIPTION OF THE SEVERAL VIEWS DRAWINGS

DETAILED DESCRIPTION OF THE INVENTION

1. The Portable Laser Processing Module

Figure 1:
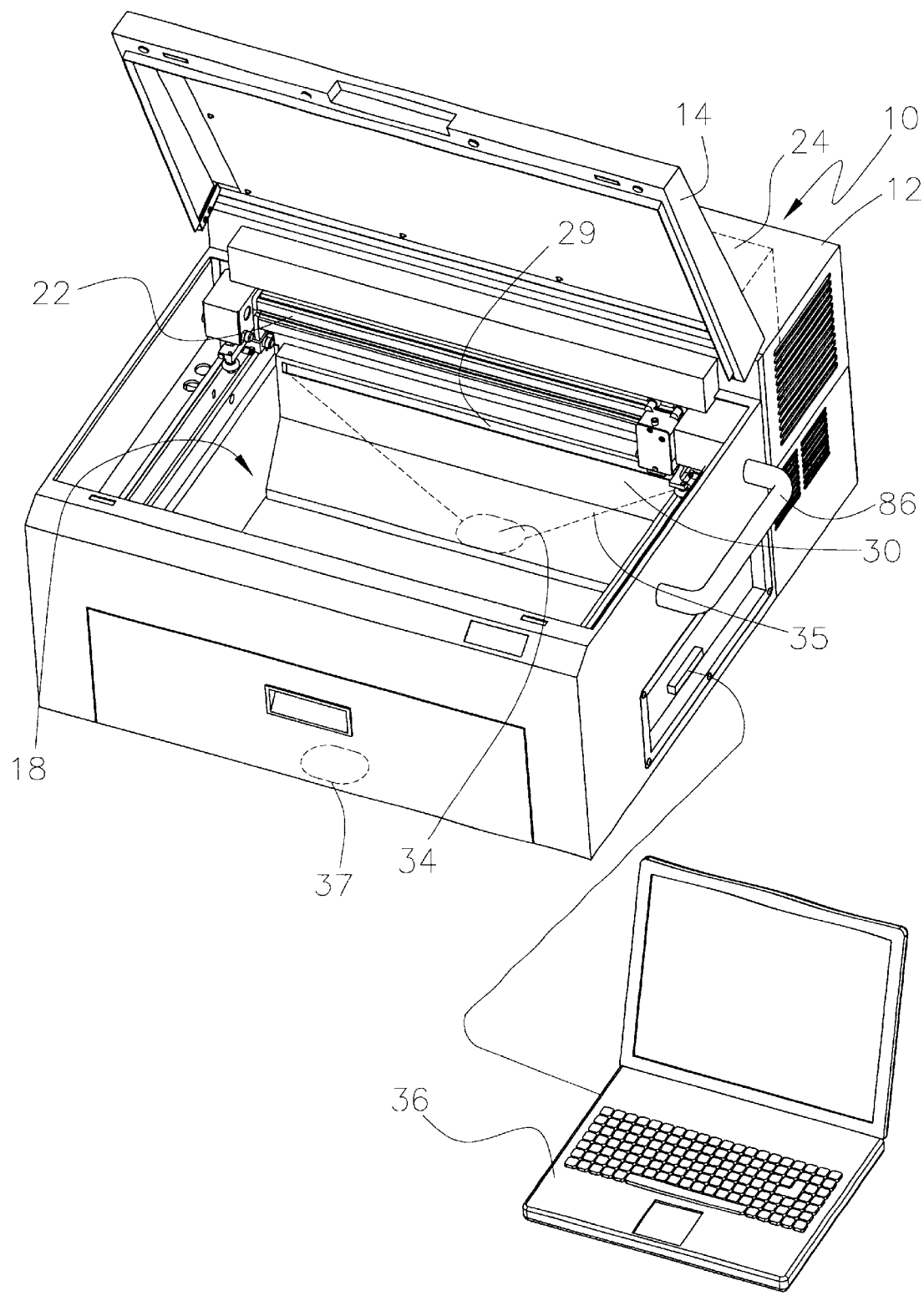
FIG. 1 is a perspective view of the portable laser processing module of the present invention with the lid open and showing the internal fume exhaust system of the module.

As seen in FIG. 1, a laser processing module 10 of the present invention has a housing 12 with a lid 14 covering a work table (not shown) for supporting a workpiece (not shown) in a work area 18 and an X-Y beam delivery system 22 the optical axis of which is pre-aligned to coincide with the beam path of a laser 24 mounted in the rear of the laser processing module 10.

The laser processing module 10 includes an air inlet opening 37, an exhaust port 34 through the base of the module 10 over which is an exhaust manifold 30 having a channel shaped back portion and an exhaust inlet opening 29. The exhaust inlet opening 29, the channel shaped back portion of manifold 30, and the exhaust port 34 form a continuous passageway 35 from the work area 18 to the exterior under side of the laser processing module 10.

The laser processing module 10 is controlled by a portable computer 36 which has a work program in memory and which plugs into the laser processing module 10, and, when the module 10 is turned on, the workpiece has been loaded, the exhaust blower 54 (FIGS. 2B, 3B) started (as described in greater detail below), and the lid 14 closed, the portable computer 36 is directed to send the work program signals through its parallel port to the laser processing module 10 to perform the work program on the workpiece in the same manner as it would direct a printer to print a document.

During operation, room air enters the work area 18 to replace fumes, smoke, debris, and contaminants created during operation which are removed from the work area 18 through the passageway 35 by the negative pressure created in the work area by the blower 54, as more fully described below.

2. The Exhaust Docking Station

Figure 2A:
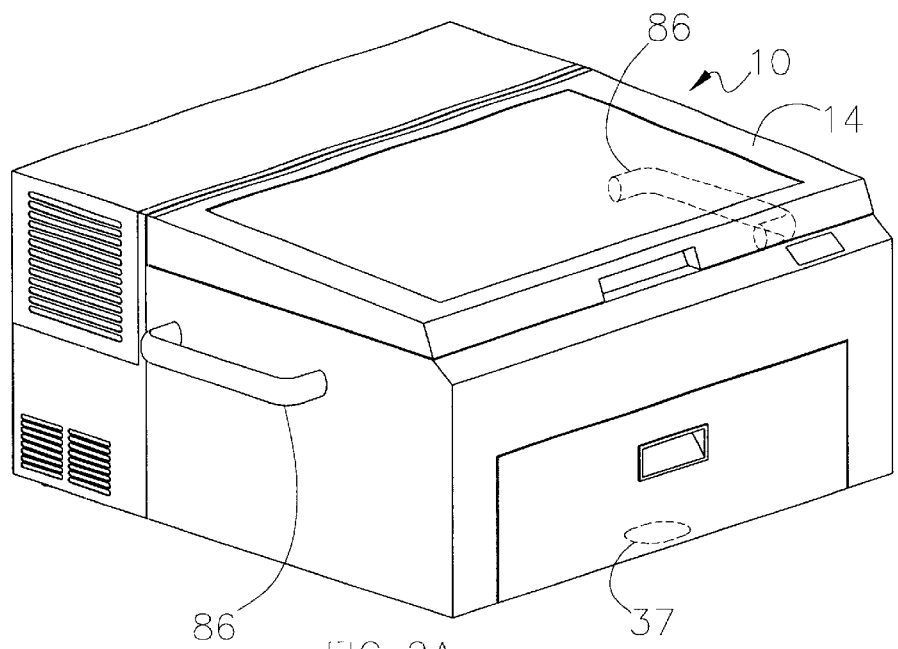
FIG. 2A is a perspective view of the portable laser processing module of FIG. in position to be mounted on the stationary docking station of the present invention as seen of FIG. 2B.
Figure 2B:
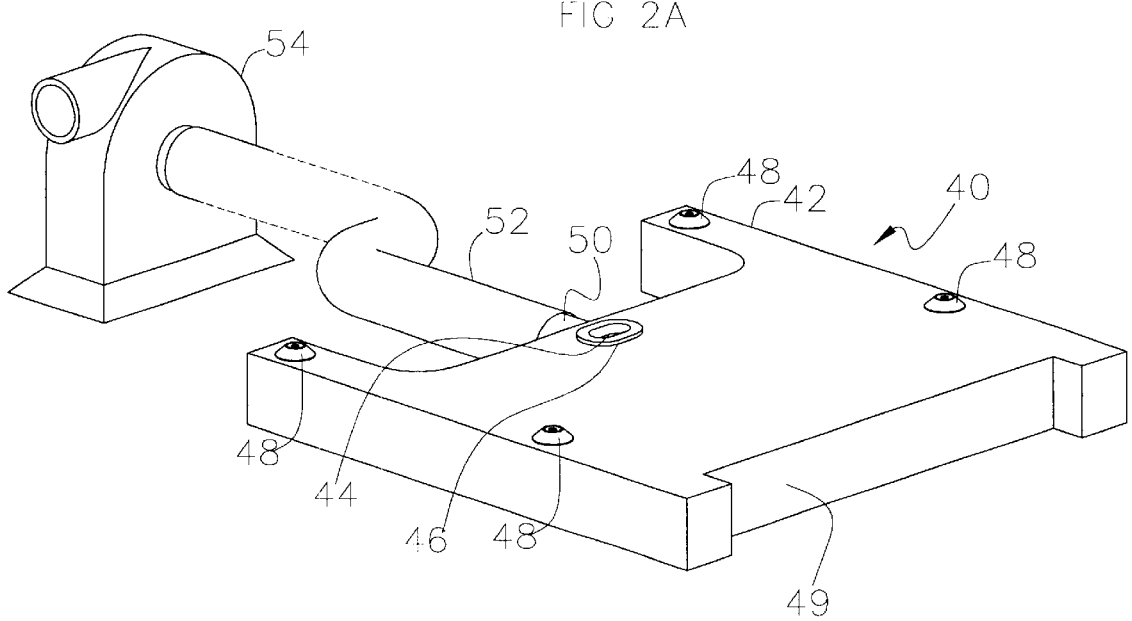
FIG. 2B is a perspective view of the stationary docking station of the present invention in position to receive the portable laser processing module of FIG. 2A.

As seen in FIGS. 2A, 2B the exhaust docking station of the present invention is a platform or housing 42 made of sturdy metal with a corrosion resistant coating or nonflammable plastic for supporting the laser processing module 10 as part of a fixed, stationary installation. The housing 42 has an inlet port 44 positioned to mate with exhaust port 34 of the laser processing module 10 when the module is properly positioned atop the housing 42. The size and shape of the housing 42 is generally designed to mate with the shape of module 10, and the beveled docking lugs 48 mate with beveled recesses (not shown) in the base of module 10 for guiding the module into a proper and aligned fit atop the docking station 40. Gasket 46 forms a seal between the module 10 and docking station 40 around their respective exhaust 34 and inlet 44 openings. Cutout 49 accommodates the air inlet 37 in the laser processing module 10. Inlet port 44 is ducted to exhaust outlet opening 50 to which is connected tubing 52 connected to exhaust blower 54 located outside of the facility for exhausting the fumes, smoke, debris, and contaminants directly to the atmosphere outside of the facility, or, optionally, through a facility filtration device (not shown). Exhaust docking station operates 100% open loop in that none of the exhausted air is recirculated back to the portable laser processing module 10. When operating, there is a negative pressure from the work area through the passageway 35 and ducting 52 to the outside blower 54 preventing any fumes from escaping into the facility.

3. The Portable Air Processing Module

Figure 3A:
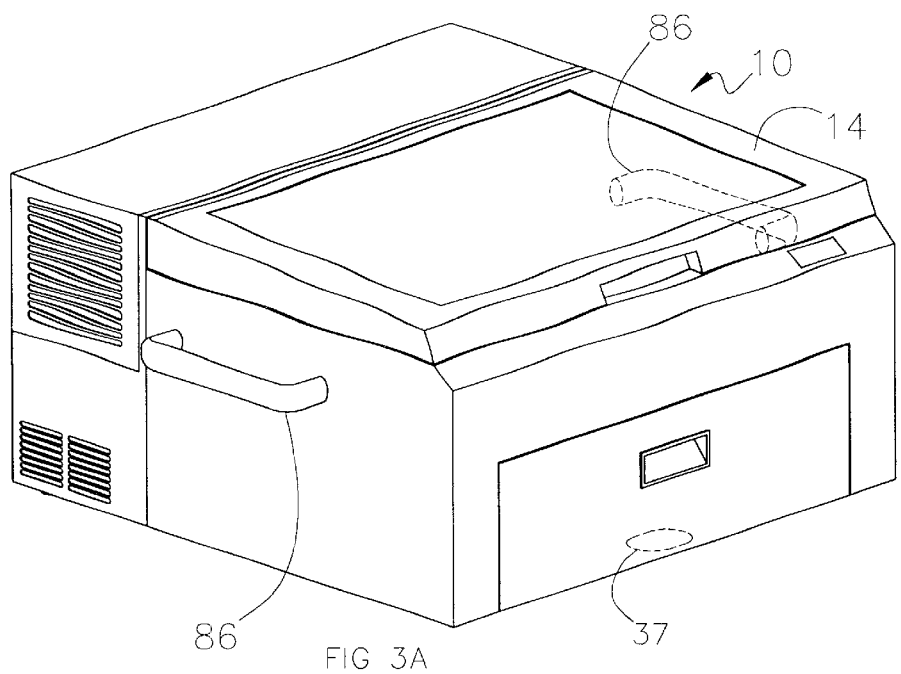
FIG. 3A is a perspective view of the portable laser processing module of FIG.1 in position to be mounted on the mobile, portable air processing module of the present invention as seen of FIG. 3B.
Figure 3B:
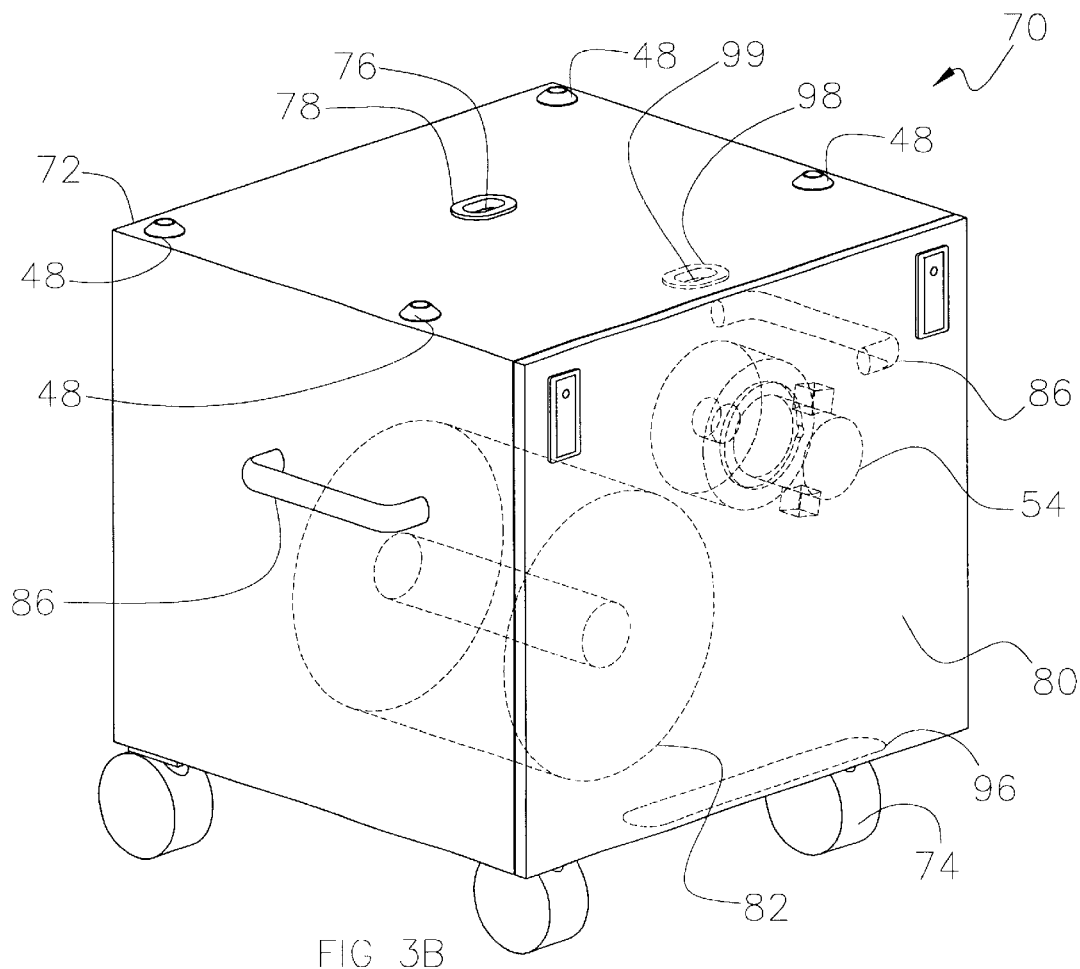
FIG. 3B is a perspective view of the mobile, portable air processing module of the present invention in position to receive the portable laser processing module of FIG. 3A.

As seen in FIGS. 3A, 3B the portable air processing unit 70 of the present invention is a portable or mobile cabinet or housing 72 also made of a sturdy corrosion resistant metal or nonflammable plastic material for supporting the laser processing module 10 as part of a portable or mobile installation. Cabinet 72 has an inlet port 76 positioned to mate with exhaust port 34 of the laser processing module 10 when the module is properly positioned atop the cabinet 72. The size and shape of the cabinet 72 is generally designed to mate with the shape of module 10. Gasket 78 forms a seal between the module 10 and the portable air processing unit 70 around their respective exhaust port 34 and inlet opening 76. Inlet port 76 directs air through a set of filters 82 ducted to an exhaust blower 54 located inside the cabinet 72 for receiving the fumes, smoke, debris, and contaminants from the portable laser processing module 10 and filtering, cleansing, and exhausting them fully into the facility through air outlet 96, or, partially recirculating them in a semi-closed loop operation. When operating in the semi-closed loop method, about 80% of the filtered air is recirculated back to the portable laser processing module 10 through optional outlet 99 sealingly mated by gasket 98 with inlet 37 in the portable laser processing module 10 and 20% is recycled to the facility through outlet 96 thereby maintaining a negative pressure in the work area 18 and preventing fumes from escaping into the room from module 10. Handles 86 and wheels 74 are used for carrying or wheeling the cabinet 72 for use in any temporary or field applications. Door 80 allows access to the interior of the cabinet 72 for servicing and replacing the set of filters 82 and the blower 54 housed therein.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A portable laser processing module operable with a separate fumes extraction device having an inlet port and a support structure for removably supporting said module thereon, said module comprising:

a housing supporting therein a laser for generating a laser beam and a beam delivery system, said housing including a surface having an exhaust port therethrough;

a work area within said housing for supporting a workpiece therein, said beam delivery system being for delivering said laser beam to the workpiece; and a passageway from said exhaust port to said work area for passage of fumes from said work area to said exhaust port, wherein, when said housing is removably supported on the fumes extraction device by the support structure, said exhaust port sealingly mates directly with an inlet port of the fumes extraction device, whereby fumes from said work area are extractable to the fumes extraction device through said passageway.

2. The module of claim 1, wherein said passageway includes an exhaust manifold in said housing having an opening open to said work area.

3. The module of claim 1, wherein the support structure includes guides for cooperatively positioning said housing on the fumes extraction device.

4. The module of claim 1, further comprising a gasket on the fumes extraction device for sealing said exhaust port to the inlet port.

5. The module of claim 1, further comprising an air inlet opening in said housing for admitting air into said work area from the atmosphere during an open loop operation of said module.

6. The module of claim 5, wherein the fumes extraction device is a stationary device and wherein, when said module is supported on the fumes extraction device, said air inlet is open to the atmosphere.

7. The module of claim 5, wherein the fumes extraction device is a portable device and wherein, when said module is supported on the fumes extraction device, said air inlet is closed to the atmosphere to permit operation of said module in a substantially closed loop operation.

8. The module of claim 7, wherein said substantially closed loop operation is an about 80% closed loop operation.

9. The module of claim 1, wherein said surface having said exhaust port therethrough is a base surface of said module and the inlet port of the fumes extraction device is in a upper surface of the fumes extraction device.

10. A stationary docking station for supporting thereon a separate, portable laser processing module, the module comprising a housing supporting therein a laser source for generating a laser beam and a beam delivery system, the housing including a surface having an exhaust port therethrough and a work area within the housing, the work area being for supporting a workpiece therein and the beam delivery system being for delivering the laser beam to the workpiece, the module further comprising a passageway from the exhaust port to the work area for passage of fumes from the work area to the exhaust port, said stationary docking station comprising:

a support structure for removably supporting the housing on said stationary docking station;

an inlet port;

an exit port connectable to a fumes extraction apparatus; and an exhaust path from said inlet port to said exit port, wherein, when the housing is supported on said stationary docking station by said support structure, the exhaust port of the module sealingly mates directly with said inlet port, whereby fumes from the work area are extractable to said exit port through the passageway.

11. The stationary docking station of claim 10, wherein said support structure includes guides for cooperatively positioning the housing on said stationary docking station.

12. The stationary docking station of claim 10, further comprising a gasket for sealing the exhaust port to said inlet port.

13. The stationary docking station of claim 10, wherein the housing of the module includes an air inlet for admitting air into the work area from the atmosphere during an open loop operation of the module, and wherein said stationary docking station includes a recessed opening accommodating the air inlet such that, when the module is supported on said stationary docking station, the air inlet is open to the atmosphere through said recessed opening.

14. The stationary docking station of claim 10, wherein the surface having the exhaust port therethrough is a base surface of the module and said inlet port is in a upper surface of said stationary docking station.

15. A portable air processing module for supporting thereon a separate, portable laser processing module, the laser processing module comprising a housing supporting therein a laser for generating a laser beam and a beam delivery system, the housing including a surface having an exhaust port therethrough and a work area within the housing, the work area being for supporting a workpiece in the work area and the beam delivery system being for delivering the laser beam to the workpiece, the laser processing module further comprising a passageway from the exhaust port to the work area for permitting passage of fumes from the work area to the exhaust port, said air processing module comprising:

a compartment containing an air processing unit and having an inlet port;

a support structure for removably supporting the housing on said air processing module, such that when the housing is supported on said air processing module by said support structure, the exhaust port of the laser processing module sealingly mates directly with said inlet port; and an exhaust path from said inlet port to said air processing unit, whereby fumes from the work area are extractable to said air processing unit through the passageway.

16. The air processing module of claim 15, wherein said support structure includes queries for cooperatively positioning the housing on said air processing module.

17. The air processing module of claim 15, further comprising a gasket for sealing the exhaust port to said inlet port.

18. The air processing module of claim 15, wherein the housing of the laser processing module includes an air inlet for admitting air into the work area from the atmosphere during an open loop operation of the laser processing module, wherein when the laser processing module is supported on said air processing module, the air inlet of the laser processing module is closed to the atmosphere to permit operation of the laser processing module in a substantially closed loop operation.

19. The air processing module of claim 18, wherein said substantially closed loop operation is an about 80% closed loop operation.

20. The air processing module of claim 19, further comprising a first air outlet for discharging air from said compartment to the atmosphere and a second air outlet, and wherein the housing includes an air inlet such that, when the housing is supported on said air processing module by said support structure, the air inlet of the housing sealingly mates directly with said second air outlet, and wherein during said about 80% closed loop operation, a recirculated portion of air from said compartment is delivered to the work area through said second air outlet and the air inlet of the housing, and a balance of the air from said compartment is exhausted to the atmosphere through said first air outlet in order to maintain a negative pressure in the work area.

21. The air processing module of claim 15, wherein said air processing unit includes at least one air filter.

22. The air processing module of claim 15, wherein said air processing unit includes a blower for communicating with the passageway for creating a negative pressure in the interior of the work area for removal of fumes, debris, particulates or contaminants from the work area.

23. The air processing module of claim 15, wherein the surface having the exhaust port therethrough is a base surface of the laser processing module and said inlet port is in a upper surface of said compartment.

24. A laser processing system, comprising:

a portable laser processing module comprising:

a housing supporting therein a laser for generating a laser beam and a beam delivery system, said housing including a surface having an exhaust port therethrough, a work area within said housing for supporting a workpiece in said work area, and said beam delivery system being for delivering said laser beam to the workpiece, and a passageway from said exhaust port to said work area for passage of fumes from said work area to said exhaust port;

a stationary docking station comprising:

a first support structure for removably supporting said housing on said stationary docking station, a first inlet port, an exit port connectable to a fumes extraction apparatus, and a first exhaust path from said first inlet port to said port; and a portable air processing module comprising:

a compartment containing an air processing unit and a second inlet port, a second support structure for removably supporting said housing on said air processing module, and a second exhaust path from said second inlet port to said air processing unit, wherein said housing is alternatively removably supportable on either said stationary docking station or said portable air processing module such that:

when said housing is supported on said stationary docking station by said first support structure, said exhaust port of said laser processing module sealingly mates directly with said first inlet port, whereby fumes from said work area are extractable to said exit port through said passageway, and when said housing is supported on said air processing module by said second support structure, said exhaust port of said laser processing module sealingly mates directly with said second inlet port, whereby fumes from said work area are extractable to said air processing unit through said passageway.

25. The system of claim 24, wherein said passageway includes an exhaust manifold in said housing having an opening open to said work area.

26. The system of claim 24, wherein said first support structure includes guides for cooperatively positioning said housing on said stationary docking station.

27. The system of claim 24, wherein said stationary docking station further comprises a gasket for sealing the exhaust port to said first inlet port.

28. The system of claim 24, wherein said housing includes an air inlet for admitting air into said work area from the atmosphere during an open loop operation of said laser processing module, and wherein said stationary docking station includes a recessed opening accommodating the air inlet such that, when said laser processing module is supported on said stationary docking station, said air inlet is open to the atmosphere through said recessed opening.

29. The system of claims 24, wherein said surface having said exhaust port therethrough is a base surface of said laser processing module and said first inlet port is in a upper surface of said stationary docking station.

30. The system of claim 24, wherein said second support structure includes guides for cooperatively positioning said housing on said air processing module.

31. The system of claim 24, wherein said air processing module further comprises a gasket for sealing the exhaust port to said second inlet port.

32. The system of claim 24, wherein said housing includes an air inlet for admitting air into said work area from the atmosphere during an open loop operation of said laser processing module, wherein when said laser processing module is supported on said air processing module, said air inlet of said laser processing module is closed to the atmosphere to permit operation of said laser processing module in a substantially closed loop operation.

33. The system of claim 32, wherein said substantially closed loop operation is an about 80% closed loop operation.

34. The system of claim 33, wherein said air processing module further comprises a first air outlet for discharging air from said compartment to the atmosphere and a second air outlet, and wherein said housing includes an air inlet such that, when said housing is supported on said air processing module by said second support structure, said air inlet of said housing sealingly mates directly with said second air outlet, and wherein during said about 80% closed loop operation, a recirculated portion of air from said compartment is delivered to said work area through said second air outlet and said air inlet of said housing, and a balance of the air from said compartment is exhausted to the atmosphere through said first air outlet in order to maintain a negative pressure in said work area.

35. The system of claim 24, wherein said air processing unit includes at least one air filter.

36. The system of claim 24, wherein said air processing unit includes a blower for communicating with said passageway for creating a negative pressure in said work area for removal of fumes, debris, particulates or contaminants from said work area.

37. The system of claim 24, wherein said surface having said exhaust port therethrough is a base surface of said laser processing module and said second inlet port is in a upper surface of said compartment.

* * * * *